US008448148B1

(12) United States Patent
Kolawa et al.

(10) Patent No.: US 8,448,148 B1
(45) Date of Patent: May 21, 2013

(54) DETECTION OF DEADLOCKS OR RACE CONDITIONS IN PHYSICAL SYSTEMS USING LOAD TESTING

(75) Inventors: Adam K. Kolawa, Bradbury, CA (US); Nathan M. Jakubiak, Pasadena, CA (US); Mark L. Lambert, Huntington Beach, CA (US); Wilhelm Haaker, Artesia, CA (US); Neel Gandhi, Los Angeles, CA (US)

(73) Assignee: Parasoft Corporation, Monrovia, CA (US)

( * ) Notice: Subject to any disclaimer, the term of this patent is extended or adjusted under 35 U.S.C. 154(b) by 169 days.

(21) Appl. No.: 13/080,501

(22) Filed: Apr. 5, 2011

Related U.S. Application Data

(60) Provisional application No. 61/322,705, filed on Apr. 9, 2010.

(51) Int. Cl.
*G06F 9/44* (2006.01)
*G06F 9/455* (2006.01)
*G06F 11/00* (2006.01)

(52) U.S. Cl.
USPC ............ 717/134; 717/124; 703/23; 714/38.1

(58) Field of Classification Search
USPC ................ 717/124–135; 703/23–28; 714/37, 714/38.1
See application file for complete search history.

(56) References Cited

U.S. PATENT DOCUMENTS

| | | | |
|---|---|---|---|
| 6,117,007 A * | 9/2000 | Matsuyama et al. | 463/6 |
| 6,385,567 B1 * | 5/2002 | Lew et al. | 703/27 |
| 7,000,224 B1 * | 2/2006 | Osborne et al. | 717/125 |
| 2002/0147968 A1 * | 10/2002 | Barrenscheen et al. | 717/134 |
| 2008/0244532 A1 * | 10/2008 | Arcese et al. | 717/128 |
| 2008/0270841 A1 * | 10/2008 | Quilter | 714/38 |
| 2009/0144420 A1 * | 6/2009 | Attanasio et al. | 709/224 |

OTHER PUBLICATIONS

"Parasoft SOAtest User's Guide," 2008, Parasoft Corporation, p. 1-974.*
"Parasoft SOAtest Best Practices," 2009, Parasoft Corporation, p. 1-10.*

\* cited by examiner

*Primary Examiner* — Wei Zhen
*Assistant Examiner* — Qing Chen
(74) *Attorney, Agent, or Firm* — Christie, Parker & Hale, LLP.

(57) ABSTRACT

A method and system for testing a physical system including a number of input channels for receiving physical inputs, using load testing, comprising: intercepting at least a portion of the input channels; replacing at least a portion of the physical inputs of the intercepted input channels with one or more emulation programs, wherein the emulation programs include parameters which allow to control outputs of the one or more emulation programs to the intercepted input channels; configuring a functional test in a load testing software tool to drive execution of the one or more emulation programs; randomly generating outputs simulating the physical inputs, from the one or more emulation programs, by executing the load testing software tool; collecting data from the execution of the one or more emulation programs as the load testing software tool executes; and analyzing the collected data for presence or absence of deadlocks or race conditions.

19 Claims, 2 Drawing Sheets

DETECTION OF DEADLOCKS OR RACE CONDITIONS IN PHYSICAL SYSTEMS USING LOAD TESTING

CROSS REFERENCE TO RELATED APPLICATIONS

This Patent Application claims the benefits of U.S. Provisional Patent Application Ser. No. 61/322,705, filed on Apr. 9, 2010 and entitled "Detection Of Race Condition In Physical System Using Load Testing," the entire content of which is hereby expressly incorporated by reference.

FIELD OF THE INVENTION

The present invention relates generally to computer software; and more particularly to a system and method for detecting race condition and/or deadlocks in physical systems using load testing.

BACKGROUND

The problem of detecting deadlocks and/or race conditions in physical systems have long been difficult for system and software designers. The race condition may occur in software, hardware, or both. For example, in case of acceleration/brake problems in some automobiles equipped with software systems, it is possible that there are two different logical threads of execution for the software code embedded within the automobile: one for the brake, and one for the accelerator. FIG. 1 shows a simplified block diagram for an exemplary automobile system that takes physical inputs from accelerator and brake systems and sends those inputs to a software program for processing. As shown, the software program in the car may process each of these inputs as a separate thread.

When the software processes these threads, the threads might get into a deadlock. In other words, the brake thread ends up waiting on the accelerator thread, while the accelerator thread is waiting on the brake thread. This may result in ignoring both signals no matter which pedal is being pressed. Other examples of physical systems include control systems, industrial machineries, patient monitoring systems, and the like, which include a software system monitoring a plurality of inputs, for example, from physical stimulants or sensors.

Such race condition problems are challenging to debug because it is very difficult to reproduce the precise timing and input conditions that spurred the problem.

SUMMARY

In some embodiments, the present system is a method and system for testing a physical system including a number of input channels for receiving physical inputs, using load testing. The method and system include: intercepting at least a portion of said input channels; replacing at least a portion of said inputs of said intercepted input channels with one or more emulation programs, wherein the emulation programs include parameters which allow to control outputs of said one or more emulation programs to said intercepted input channels; configuring a functional test in a load testing software tool to drive execution of said one or more emulation programs; randomly generating outputs simulating the actual physical inputs, from the one or more emulation programs, by executing the load testing software tool; monitoring and collecting data from the execution of said one or more emulation programs as the load testing software tool executes; and analyzing said collected data for presence or absence of deadlocks, or race conditions.

In some embodiments, the present system is a method for testing a physical system including a number of input channels for receiving physical inputs, using load testing. The method includes: replacing at least a portion of said inputs of said input channels with one or more emulation programs; generating inputs simulating the physical inputs from the one or more emulation programs by driving the one or more emulation programs with a load testing software tool; monitoring and collecting data as the load testing software tool executes; and analyzing said collected data for errors in the system.

For example, the number of input channels may include a first channel for receiving inputs from a brake pedal of a car, and a second channel for receiving inputs from an accelerator pedal of the car. In some embodiments, the data is monitored and collected by the load testing software tool.

In some embodiments, the method and system may further include generating a report of data gathered from the emulation programs and/or the physical system, during the execution of the load testing software tool, that illustrates the presence or absence of deadlocks or race conditions.

DETAILED DESCRIPTION

Figure 1:
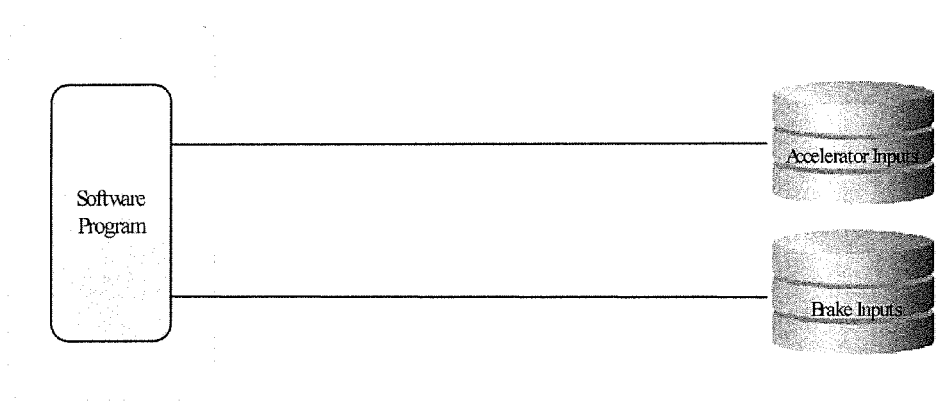
FIG. 1 shows a simplified block diagram for an exemplary automobile system that takes physical inputs from accelerator and brake systems and sends those inputs to a software program for processing.

In some embodiments, the present system is a system or a process executed by one or more computers, which emulates the physical stimulant inputs, using load testing. Load testing has been the process of exercising a software application, for example, a Web-based or client/server application with multiple users and verifying whether the application functions correctly under tested traffic levels, patterns, and combinations. An application might function flawlessly when running with a few careful testers who exercise it in the intended manner. However, when a large number of users with incompatible systems, inevitable network delays, and applications that run for months without restarting are introduced in practice, the system is likely to slow down, encounter functionality problems or crash altogether. Load testing has helped understand how the system will fare in real-life situations so that the developers can anticipate and even prevent load-related problems.

Load testing typically involves exercising the application with virtual users and measuring performance statistics to verify whether the application supports the anticipated traffic load as well as possible traffic surges, growth, and so on. To ensure that the virtual users' experiences effectively predict the actual users' experiences, the virtual users need to simulate realistic types and combinations of click paths, realistic delays between clicks, and so forth. Ideally, load testing does not simply look at the response time and rates delivered for various load scenarios. Rather, it also involves running tests so that the developers can determine what problems, in addition to slow load times and rates, might occur in different situations. For example, load testing should identify load scenarios that can cause problems such as, transactions that do not execute correctly, bottlenecks and delays that frustrate users and reduce user productivity, transactions that do not satisfy service level agreements, and interface pages that do not load correctly or do not load at all.

Problems such as bottlenecks, deadlocks, race conditions and other kinds of abnormal execution are found during load testing by monitoring the performance of the system under test. There is a wide range of data that could be monitored. The amount of time it takes for a response to a virtual user request is one very common metric that is monitored. Other types of data are server CPU and memory usage, timing of database queries, server metrics like number of open connections, etc. By correlating all the different data collected, a user is able to deduce where their could be bottlenecks in the system. For example, if a particular page in a web application takes 10 seconds to access when 500 users are accessing it at the same time, but the same page only takes 1 second to access when 100 users are using it, the user can deduce that there is some kind of bottleneck on that page when too many users start accessing it.

Load testing programs typically allow users to generate reports that contain aggregate and individual statistics that were collected during the load test run. One example of a report might be a graph of virtual users over time and the average response time of a page as the number of users increases. The contents of the reports can typically be customized to show the data that illustrates the presence or absence of problems found during the load test. These reports can show tables of data as well—for example a list of all pages that were accessed during the load test, along with the minimum, average, and maximum response times for each page. The reports can also include data on individual hits within the load test—for example, they can show what actions were taken by an individual virtual user at a given point in time, and the data (such as response time) associated with those actions.

Load testing programs/tools are commercially available, for example, the SOAtest Extension™ tool is available from Parasoft® Corp., the entire contents of which are hereby incorporated by reference.

Figure 2:
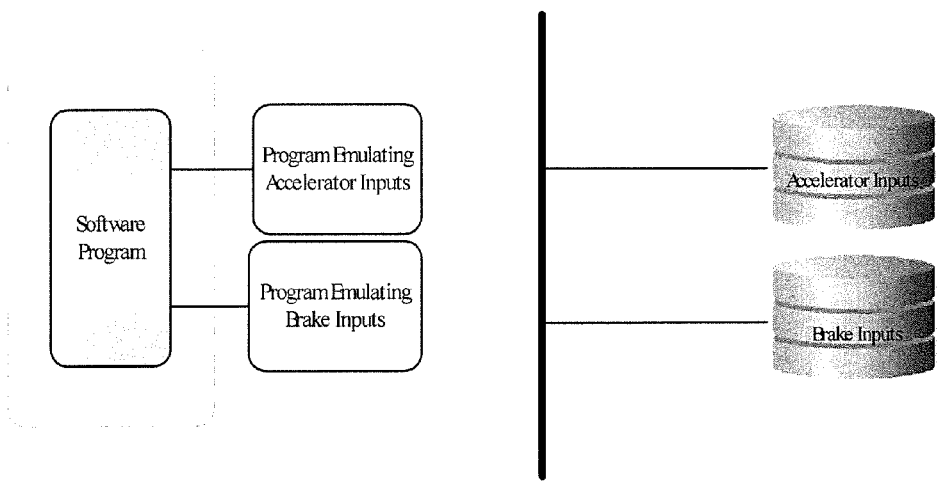
FIG. 2 shows a simplified block diagram for an exemplary software development process, according to some embodiments of the present invention.

In some embodiments, the system, or process of the present invention executed by one or more computer systems, intercepts the software communication channel between the physical inputs and the (embedded) software. It then replaces the actual physical inputs, for example, the brake inputs with a (small) program that emulates a broad range of brake inputs. For example, the emulation program simulates an array of conditions ranging from "not pressed" to "fully pressed with tremendous force." In the automobile example, the present invention also replaces the actual accelerator input with another program that emulates a broad range of accelerator inputs, as shown in FIG. 2. It is noted that the emulation programs for the brake and the accelerator inputs may be one program with different portions or two separate programs.

This can be implemented using Parasoft's® Functional and Load Testing solution—specifically, with the SOAtest Extension™ tool. Once the emulation programs are implemented and a functional test is configured to drive their execution, the next step is to set up an environment wherein the brake and accelerator emulator programs randomly generate a variety of different simulated inputs for emulating the brake and the accelerator inputs. In other words, the brake and accelerator emulator programs barrage the core software program with different types and combinations of inputs—all with randomized timing. This can be accomplished using the framework for load testing, that is, testing the system's performance under load.

The load test would be configured to monitor various parts of the overall system in order to detect bottlenecks. For example, it could look at the amount of time it takes for the inputs generated by the emulation programs to be processed by the core software program. If the input processing slows down—or if it halts altogether—a deadlock could have been found in the system. It is also possible that the core software program, once it processes the inputs, produces some kind of output (for example calling another program that causes the brakes to be applied). The load test could be configured to monitor each time that this output is produced. Correlations could be made between the inputs and the outputs—if there are ever cases where inputs are provided, but no outputs are produced, then a condition would have been found within the system where the inputs do not produce the desired result.

Reports could then be generated from the load testing software that illustrate the problems found. In our example, a graph that shows the processing time for the inputs over time could illustrate when and where the processing slowed down. Individual hit data that shows the 1000 random inputs that were used immediately before the processing slowed down could also be included in the report. This way a correlation could be made that allowed a developer to figure out which inputs were responsible for producing the slow-down. If outputs were monitored, a table that shows the total number of inputs and outputs could be produced (thus allowing someone to see that the correct number of outputs were not produced), along with a plot showing each input and output, so that a user could see for which inputs no outputs were produced.

Because this process exercises the (core or embedded) software under so many different types and combinations of input conditions, it is very likely that it will eventually hit the rare conditions under which the problem manifests itself In this way, a framework designed for load testing can be used to expose race conditions and/or deadlocks that are very difficult to reproduce. That is, in this context, load testing, which has traditionally been irrelevant to embedded systems since such systems typically are not required to handle large loads, becomes a valuable tool for simulating a wide range of conditions so that erratic software problems in physical systems can be easily diagnosed and fixed.

Figure 3:
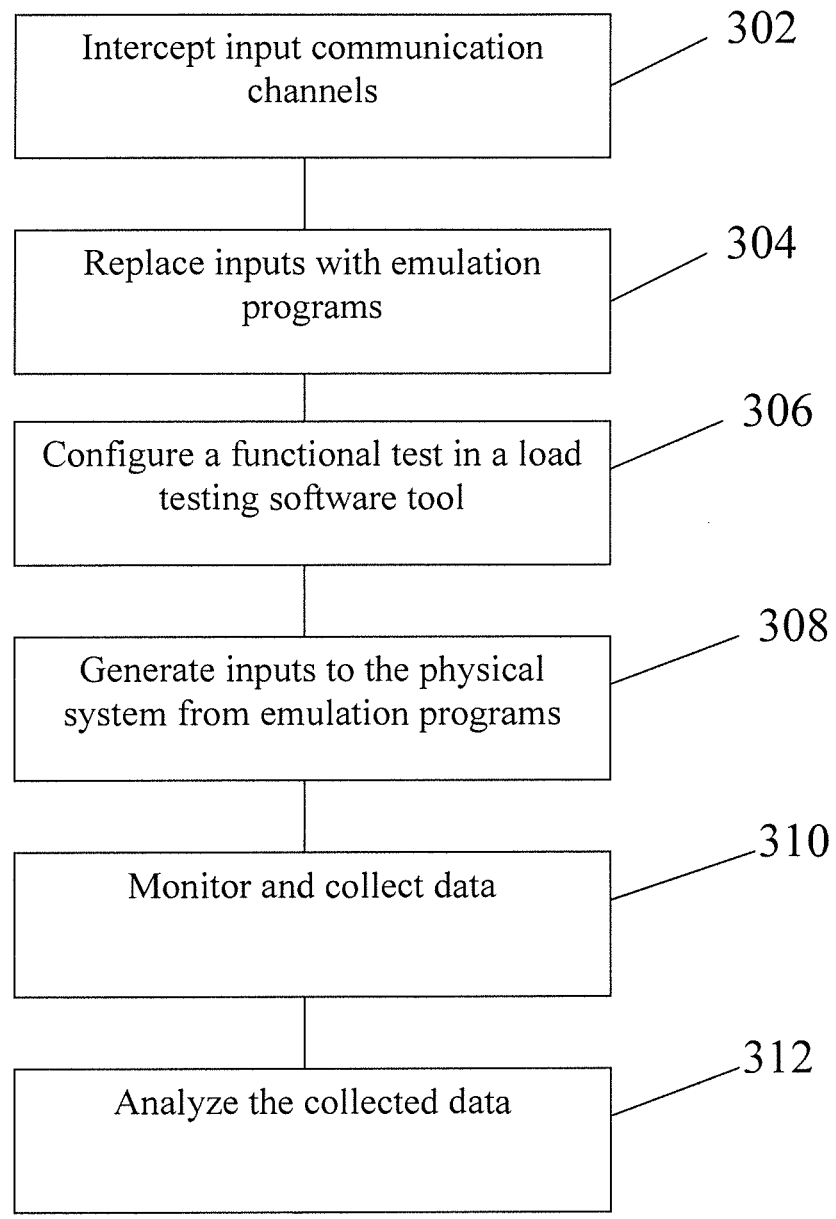
FIG. 3 shows a simplified process flow, according to some embodiments of the present invention.

FIG. 3 shows an exemplary process flow executed by one or more computers, according to some embodiments of the present invention. As shown in block 302, optionally, all or a portion of input communication channels to the core software are intercepted. The intercepted all or a portion of inputs are then replaced with one or more emulation programs with parameters which allow to control the output to the communication channels, in block 304. Optionally, a functional test is configured in a load testing software tool, such as, SOAtest Extension™ tool to drive the execution of the one or more emulation programs by invoking them with parameterized inputs, as shown in block 306. Some examples for configuring a functional test in a load testing software tool, such as, SOAtest Extension™ tool, the entire contents of which are hereby incorporated by reference. Outputs from the one or more emulation programs simulating the actual physical inputs to the physical system are (for example, randomly) generated, using the load testing software tool, in block 308. This allows the load test process to find the right condition for a race condition and/or deadlock. The collected data is optionally monitored in block 310. Optionally, reports that illustrate the presence or absence of race conditions and/or deadlocks are created from the monitored data during the load testing, as shown in block 312. The report would contain relevant monitored data that would demonstrate the presence or absence of the problem.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for testing a physical system including a plurality of input channels for receiving physical inputs, using load testing, the method comprising:
    intercepting at least a portion of said plurality of input channels of said physical system;
    replacing at least a portion of said physical inputs of said intercepted at least a portion of said plurality of input channels of said physical system with one or more emulation programs, wherein said one or more emulation programs include parameters which allow to control outputs of said one or more emulation programs to said intercepted at least a portion of said plurality of input channels of said physical system;
    configuring a functional test in a load testing software tool to drive execution of said one or more emulation programs;
    randomly generating outputs from said one or more emulation programs simulating said physical inputs by executing the load testing software tool and inputting said randomly generated outputs to said intercepted at least a portion of said plurality of input channels of said physical system;
    monitoring and collecting data from said physical system as the load testing software tool executes, wherein said monitoring includes observing the amount of time it takes for said randomly generated outputs generated by said one or more emulation programs to be processed by said physical system; and
    analyzing said collected data for presence or absence of deadlocks or race conditions.

2. The method of claim 1, wherein said plurality of input channels of said physical system include a first channel for receiving inputs from a brake pedal of a car and a second channel for receiving inputs from an accelerator pedal of the car.

3. The method of claim 1, wherein said data is monitored and collected by the load testing software tool.

4. The method of claim 1, further comprising generating a report of data gathered from said one or more emulation programs during the execution of the load testing software tool, that illustrates the presence or absence of deadlocks or race conditions.

5. The method of claim 4, wherein the report is generated by the load testing software tool.

6. The method of claim 1, further comprising generating a report of data gathered from said physical system during the execution of the load testing software tool, that illustrates the presence or absence of deadlocks or race conditions.

7. A system for testing a physical system including a plurality of input channels for receiving physical inputs, using load testing comprising:
    means for intercepting at least a portion of said plurality of input channels of said physical system;
    means for replacing at least a portion of said physical inputs of said intercepted at least a portion of said plurality of input channels of said physical system with one or more emulation programs, wherein said one or more emulation programs include parameters which allow to control outputs of said one or more emulation programs to said intercepted at least a portion of said plurality of input channels of said physical system;
    means for configuring a functional test in a load testing software tool to drive execution of said one or more emulation programs;
    means for randomly generating outputs from said one or more emulation programs simulating said physical inputs by executing the load testing software tool and inputting said randomly generated outputs to said intercepted at least a portion of said plurality of input channels of said physical system;
    means for monitoring and collecting data from said physical system as the load testing software tools executes, wherein said monitoring includes observing the amount of time it takes for said randomly generated outputs generated by said one or more emulation programs to be processed by said physical system; and
    means for analyzing said collected data for presence or absence of deadlocks or race conditions.

8. The system of claim 7, wherein said plurality of input channels of said physical system include a first channel for receiving inputs from a brake pedal of a car and a second channel for receiving inputs from an accelerator pedal of the car.

9. The system of claim 7, wherein said data is monitored and collected by the load testing software tool.

10. The system of claim 7, further comprising means for generating a report of data gathered from said one or more emulation programs during the execution of the load testing software tool, that illustrates the presence or absence of deadlocks or race conditions.

11. The system of claim 10, wherein the report is generated by the load testing software tool.

12. The system of claim 7, further comprising means for generating a report of data gathered from said physical system during the execution of the load testing software tool, that illustrates the presence or absence of deadlocks or race conditions.

13. A method for testing a physical system including a plurality of input channels for receiving physical inputs, using load testing, the method comprising:
    intercepting at least a portion of said plurality of input channels of said physical system:
    replacing at least a portion of said physical inputs of said intercepted at least a portion of said plurality of input channels of said physical system with one or more emulation programs, wherein said one or more emulation programs include parameters which allow to control outputs of said one or more emulation programs to said intercepted at least a portion of said plurality of input channels of said physical system;
    configuring a functional test in a load testing software tool to drive execution of said one or more emulation programs;
    randomly generating inputs for said physical system simulating said physical inputs, from said one or more emulation programs, by driving the execution of said one or more emulation programs with the load testing software tool and inputting said randomly generated inputs to said intercepted at least a portion of said plurality of input channels of said physical system;

monitoring and collecting data from said physical system as the load testing software tool executes, wherein said monitoring includes observing the amount of time it takes for said randomly generated inputs generated by said one or more emulation programs to be processed by said physical system; and analyzing said collected data for errors in said physical system.

14. The method of claim 13, wherein the errors are one or more of the group consisting of deadlocks and race conditions.

15. The method of claim 13, wherein said plurality of input channels of said physical system include a first channel for receiving inputs from a brake pedal of a car and a second channel for receiving inputs from an accelerator pedal of the car.

16. The method of claim 13, wherein said data is monitored and collected by the load testing software tool.

17. The method of claim 13, further comprising generating a report of data gathered from said one or more emulation programs during the execution of the load testing software tool, that illustrates presence or absence of deadlocks or race conditions.

18. The method of claim 13, further comprising generating a report of data gathered from said physical system during the execution of the load testing software tool, that illustrates presence or absence of deadlocks or race conditions.

19. The method of claim 18, wherein the report is generated by the load testing software tool.

* * * * *

UNITED STATES PATENT AND TRADEMARK OFFICE
CERTIFICATE OF CORRECTION

PATENT NO. : 8,448,148 B1
APPLICATION NO. : 13/080501
DATED : May 21, 2013
INVENTOR(S) : Adam K. Kolawa et al.

It is certified that error appears in the above-identified patent and that said Letters Patent is hereby corrected as shown below:

In the Claims

Column 6, line 19, Claim 7      Delete "tools executes",
                                Insert --tool executes--

Signed and Sealed this
Third Day of December, 2013

Margaret A. Focarino
*Commissioner for Patents of the United States Patent and Trademark Office*